United States Patent
Mullis (10) Patent No.: US 11,165,685 B2
(45) Date of Patent: Nov. 2, 2021

(54) MULTIPOINT REDUNDANT NETWORK DEVICE PATH PLANNING FOR PROGRAMMABLE NETWORKS

(71) Applicant: Schweitzer Engineering Laboratories, Inc., Pullman, WA (US)

(72) Inventor: Tristan Lloyd Mullis, Pullman, WA (US)

(73) Assignee: Schweitzer Engineering Laboratories, Inc., Pullman, WA (US)

(*) Notice: Subject to any disclaimer, the term of this patent is extended or adjusted under 35 U.S.C. 154(b) by 124 days.

(21) Appl. No.: 16/722,333

(22) Filed: Dec. 20, 2019

(65) Prior Publication Data
US 2021/0194791 A1    Jun. 24, 2021

(51) Int. Cl.
*H04L 12/761* (2013.01)
*H04L 12/751* (2013.01)

(52) U.S. Cl.
CPC .............. *H04L 45/16* (2013.01); *H04L 45/02* (2013.01)

(58) Field of Classification Search
CPC ........ H04L 45/16; H04L 45/02; H04L 45/128
See application file for complete search history.

(56) References Cited

U.S. PATENT DOCUMENTS

| | | |
|---|---|---|
| 6,747,957 B1 | 6/2004 | Pithawala |
| 7,218,632 B1 | 5/2007 | Bechtolsheim |
| 7,376,831 B2 | 5/2008 | Kollmyer |
| 7,872,983 B2 | 1/2011 | Lai |
| 8,553,544 B2 | 10/2013 | Lai |
| 8,800,044 B2 | 8/2014 | Raad |
| 9,038,151 B1 | 5/2015 | Chua |
| 9,237,129 B2 | 1/2016 | Ling |
| 9,286,171 B2 | 3/2016 | Cardona |
| 9,432,255 B1 | 8/2016 | Hasan |
| 9,432,380 B2 | 8/2016 | Margalit |
| 9,680,588 B2 | 6/2017 | Connolly |
| 9,686,125 B2 | 6/2017 | Smith |
| 9,769,060 B2 | 9/2017 | Dearien |
| 2002/0172157 A1 | 11/2002 | Rhodes |

(Continued)

FOREIGN PATENT DOCUMENTS

| | | |
|---|---|---|
| EP | 2765751 | 8/2014 |
| KR | 20150051107 | 5/2015 |
| WO | 2015038040 | 3/2015 |

OTHER PUBLICATIONS

Braun, Wolfgang, Menth, Michael, Software-Defined Networking Using OpenFlow: Protocols, Applications and Architectural Design Choices, Future Internet, May 12, 2014.

(Continued)

*Primary Examiner* — Walli Z Butt
(74) *Attorney, Agent, or Firm* — Richard M. Edge (57) ABSTRACT

Disclosed are systems and methods for path planning in a programmable communications network with multipoint nodes. The multipoint nodes include nodes with multiple connections to the programmable communication network. Path planning determines source multipoint nodes and destination multipoint nodes. Paths are planned to avoid redundant delivery of messages to a single interface of the multipoint nodes. A network controller programs network communications devices with the determined paths. Multipoint nodes may include multipoint devices or traditional tie points.

20 Claims, 8 Drawing Sheets

(56) References Cited

U.S. PATENT DOCUMENTS

| | | |
|---|---|---|
| 2003/0112821 A1 | 6/2003 | Cleveland |
| 2003/0125924 A1 | 7/2003 | Lines |
| 2003/0133443 A1 | 7/2003 | Klinker |
| 2003/0188159 A1 | 10/2003 | Josset |
| 2005/0025141 A1 | 2/2005 | Chao |
| 2005/0078672 A1 | 4/2005 | Caliskan |
| 2005/0192008 A1 | 9/2005 | Desai |
| 2008/0005558 A1 | 1/2008 | Hadley |
| 2008/0080384 A1 | 4/2008 | Atkins |
| 2009/0257743 A1 | 10/2009 | Chung |
| 2009/0285093 A1 | 11/2009 | Bolt |
| 2009/0313189 A1 | 12/2009 | Sun |
| 2010/0241608 A1 | 9/2010 | Huang |
| 2011/0085567 A1 | 4/2011 | Beecroft |
| 2011/0087952 A1 | 4/2011 | Marin |
| 2013/0077477 A1 | 3/2013 | Daraiseh |
| 2013/0108259 A1 | 5/2013 | Srinivas |
| 2013/0159865 A1 | 6/2013 | Smith |
| 2013/0212285 A1 | 8/2013 | Hoffmann |
| 2013/0250770 A1 | 9/2013 | Zou |
| 2013/0263247 A1 | 10/2013 | Jungck |
| 2013/0294228 A1 | 11/2013 | Ahuja |
| 2014/0025945 A1 | 1/2014 | McGrew |
| 2014/0029451 A1 | 1/2014 | Nguyen |
| 2014/0064100 A1 | 3/2014 | Edwards et al. |
| 2014/0112130 A1 | 4/2014 | Yang et al. |
| 2014/0115706 A1 | 4/2014 | Silva et al. |
| 2014/0129700 A1 | 5/2014 | Mehta |
| 2014/0153572 A1 | 6/2014 | Hampel |
| 2014/0160939 A1 | 6/2014 | Arad |
| 2014/0226467 A1 | 8/2014 | Park |
| 2014/0241345 A1 | 8/2014 | DeCusatis |
| 2014/0245387 A1 | 8/2014 | Colpo |
| 2014/0280834 A1 | 9/2014 | Medved |
| 2014/0325038 A1 | 10/2014 | Kis |
| 2014/0325649 A1 | 10/2014 | Zhang |
| 2014/0371941 A1 | 12/2014 | Keller et al. |
| 2014/0376406 A1 | 12/2014 | Kim |
| 2015/0081762 A1 | 3/2015 | Mason et al. |
| 2015/0112933 A1 | 4/2015 | Satapathy |
| 2015/0195190 A1 | 7/2015 | Shah Heydari |
| 2015/0312658 A1 | 10/2015 | Winzer |
| 2015/0363522 A1 | 12/2015 | Maurya |
| 2016/0043996 A1 | 2/2016 | Syed Mohamed |
| 2016/0119299 A1 | 4/2016 | Amulothu |
| 2016/0142427 A1 | 5/2016 | de los Reyes |
| 2016/0165454 A1 | 6/2016 | Li |
| 2016/0330076 A1 | 11/2016 | Tiwari |
| 2016/0337247 A1 | 11/2016 | Yao |
| 2016/0344592 A1 | 11/2016 | Cook |
| 2017/0026225 A1 | 1/2017 | Smith |
| 2017/0026226 A1 | 1/2017 | Grussling |
| 2017/0026243 A1 | 1/2017 | Berner |
| 2017/0026252 A1 | 1/2017 | Dearien |
| 2017/0026276 A1 | 1/2017 | Dearien |
| 2017/0026291 A1* | 1/2017 | Smith ............... H04L 45/28 |
| 2017/0026292 A1 | 1/2017 | Smith |
| 2017/0026349 A1 | 1/2017 | Smith |
| 2017/0317780 A1* | 11/2017 | Wood ............... H04B 10/27 |
| 2019/0116053 A1* | 4/2019 | Allan ............... H04L 12/4633 |
| 2019/0273717 A1* | 9/2019 | Dearien ............ H04L 12/465 |

OTHER PUBLICATIONS

Cahn, Adam, Hoyos, Juan, Hulse, Matthew, Keller, Eric, Software-Defined Energy Communication Networks: From Substation Automation to Future Smart Grids, Smart Grid Communications, IEEE Oct. 2013.

Dally, William J., Virtual-Channel Flow Control, IEEE Transactions on Parallel and Distributed Systems, vol. 3, No. 2, Mar. 1992.

Jain, Sushant, et al., B4: Experience with a Globally-Deployed Software Defined WAN, ACM SIGCOMM Computer Communication Review, vol. 43 Issue 4, pp. 3-14. Oct. 2013.

Monaco, Matthew, Michel, Oliver, Keller, Eric, Applying Operating System Principles to SDN Controller Design, Hotnets '13, Nov. 2013.

Drutskoy, Dmitry, Keller, Eric, Rexford, Jennifer, Scalable Network Virtualization in Software-Defined Networks, IEEE Internet Computing, vol. 17, Issue: 2, Nov. 27, 2012.

Kuzniar, Maciej, et al., Automatic Failure Recovery for Software-Defined Networks, HotSDN '13, Aug. 16, 2013.

Mizrahi, Tal, Moses, Yoram. ReversePTP: A Software Defined Networking Approach to Clock Synchronization, HotSDN '14, Aug. 22, 2014.

Ramos, Ramon Marques, et al. SlickFlow: Resilient Source Routing in Data Centere Networks Unlocked by OpenFlow, 2013 IEEE 38th Conference on Local Computer Networks, Oct. 2013.

Torhonen, Ville, Designing a Software-Defined Datacenter, Master of Science Thesis, Tampere University of Technology, May 2014.

Yang, Qiaoyin and Smith, Rhett, Improve Protection Communications Network Reliability Through Software-Defined Process Bus, Jan. 2018.

Dearien, Jason: "Setting Up a Fully Redundant RSTP-to-SDN Tie Point" Application Guide, vol. II AG2017-28, Sep. 22, 2017.

* cited by examiner

Figure 8

MULTIPOINT REDUNDANT NETWORK DEVICE PATH PLANNING FOR PROGRAMMABLE NETWORKS

TECHNICAL FIELD

The present disclosure relates to systems and methods for multipoint redundant network device path planning for a programmable network. More particularly, but not exclusively, the techniques disclosed in the present application allow a communication network to provide redundant communication channels to a multipoint node without duplicating packet delivery to an interface of the multipoint node.

BRIEF DESCRIPTION OF THE DRAWINGS

The written disclosure herein describes illustrative embodiments that are nonlimiting and non-exhaustive. This disclosure references certain of such illustrative embodiments depicted in the figures described below.

DETAILED DESCRIPTION

Systems of devices for the protection, control, and automation of industrial and utility equipment may use a communication network to facilitate various operations. The communication network may be configured to provide secure and reliable exchange of data among the various devices. Redundancies may be built into the devices as well as the communication network. Modern electric power distribution and transmission systems may incorporate a variety of communication technologies that may be used in the protection, control, and automation of the power system. The communication networks carry information necessary for the proper assessment of power system conditions and for implementing control actions based on such conditions. In addition, such messages may be subject to time constraints because of the potential for rapid changes in conditions in the electric power system.

In some instances, single devices may include multiple communication ports useful for communication redundancy. For example, a protective relay used to protect, control, and/or automate equipment of an electric power delivery system may be a single device, yet include two communication ports, each connected on physically distinct media to the communication network in order to provide redundancy. One of the communication ports may be in active mode whereby communications received thereby are actively received and sent to further processing by the device. The other of the communication ports may be in inactive mode whereby communications are not sent to further processing. Every communication packet intended for the device should be delivered on both communication ports by the communication system. Upon failure of the active communication port or failure of the communication system to complete delivery of communications on the active communication port, the device may activate the inactive communication port and process communications received thereon. In another example, a tie-point between a programmable communications network such as a software-defined network (SDN) and a traditional communication network may function as a single node with two or more physically distinct media connections. The tie point may be a single device or multiple devices configured to act as a single tie point to the programmable communications network. Such nodes or devices that embody a physical networking configuration that uses two or more links to connect into a programmable communications network for redundancy is termed herein as a multipoint node.

Multipoint nodes may present certain challenges in network configuration. One challenge is to prevent delivering the same communication packet to the same interface of the multipoint node. Because a multipoint node includes redundant physical communications connections to the programmable network, and the same communication package may be delivered to the multipoint node on more than one of the physical connections to the programmable network. That is, the programmable network may be configured to deliver every packet destined to the multipoint node (or a device connected to the traditional communication network behind the tie point) must be delivered on each connection of the multipoint node to the programmable network, but not redundantly delivered on the same connection. Typically, a programmable network may be configured with one or more failover paths if a particular communication path becomes unavailable. Unless the programmable communication network is particularly designed to avoid redundant delivery of communication packets to a single interface of a multipoint node, the failover my result in this unwanted redundant delivery.

What is needed is a tool for path planning in a programmable communication network with multipoint nodes. Presented herein are systems and methods to manage path planning in a programmable communication network with multipoint nodes. Path planning performed by devices and methods described herein deliver communication packets to each multipoint node interface while avoiding redundant delivery on the same interface even under failover conditions.

The embodiments of the disclosure can be further understood by reference to the drawings, wherein like parts are designated by like numerals throughout. Components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. Also, the steps of a method do not necessarily need to be executed in any specific order, or even sequentially, nor need the steps be executed only once unless otherwise specified.

Embodiments herein may be described with reference to an SDN. Unless stated otherwise, the systems and methods described herein may be used with an SDN or other applicable programmable communications network. Several aspects of the embodiments described may be implemented as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or another electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor-executable instructions.

In various embodiments, a controller may be used to configure networking devices, establish network flows, and monitor network conditions. SDN networking technologies offer a variety of advantages to electric power systems. For example, SDN networking technologies allow for rapidly configurable deny-by-default security, better latency control, symmetric transport capabilities, redundancy and failover planning, etc. An SDN supports a programmatic change control platform that allows an entire communication network to be managed as a single asset, simplifies the understanding of the network, and enables continuous monitoring of a network. In an SDN, the systems that decide where the traffic is routed (i.e., the control plane) can be distinct from the systems that perform the forwarding of the traffic in the network (i.e., the data plane).

The control plane may be modified to achieve an optimal or target usage of network resources by creating specific data flows through the communication network. A "flow entry" is used to refer to the set or sets of parameters the control data flows. A "data flow," or simply "flow," is used to refer to any type of data transfer in a network, such as a set or sequence of IP packets sent from a particular source to a particular unicast, anycast, or multicast destination. Data flow entries may permit specific network paths based on a variety of criteria that offer significant and precise control to operators of the network. In many SDN embodiments, an SDN controller embodies the network control plane and determines how packets (or frames) should flow (or be forwarded) in the network. The SDN controller communicates this information to the networking devices in the data plane by setting their forwarding tables and/or other configuration settings. Accordingly, an SDN enables centralized configuration and management of a network. The data plane in an SDN includes packet forwarding devices with communication interfaces to receive forwarding information from the controller.

One approach to differentiate and forward packets includes VLAN tagging. A Virtual Local Area Network (VLAN) can segregate traffic in a network with shared topology. Packets may have a VLAN ID or tag to indicate to where the packet should be forwarded. In addition to simplifying management of a network, an SDN architecture also enables monitoring and troubleshooting features that can be beneficial for use in an industrial or utility system.

A variety of communication devices may utilize the various embodiments described herein. A communication device, as the term is used herein, includes any device that is capable of accepting and forwarding data traffic in a data communication network. In addition to the functionality of accepting and forwarding data traffic, communication devices may also perform a wide variety of other functions and may range from simple to complex devices.

Specific examples of communication devices applicable to the systems and methods described herein include, but are not limited to, switches, hubs, repeaters, gateways, routers, network bridges, modems, wireless access points, and line drivers. As used herein the term "communication device" may, as the context allows, also encompass a wide variety of hybrid networking devices such as multilayer switches, protocol converts, terminal adapters, bridge routers, proxy servers, firewall devices, network address translators, multiplexers, network interface controllers, and the like. Thus, while many of the principles of the systems and methods are described herein using a network switch as an example, it is appreciated that such principles may be adapted for use with many other networking device types.

Figure 1:
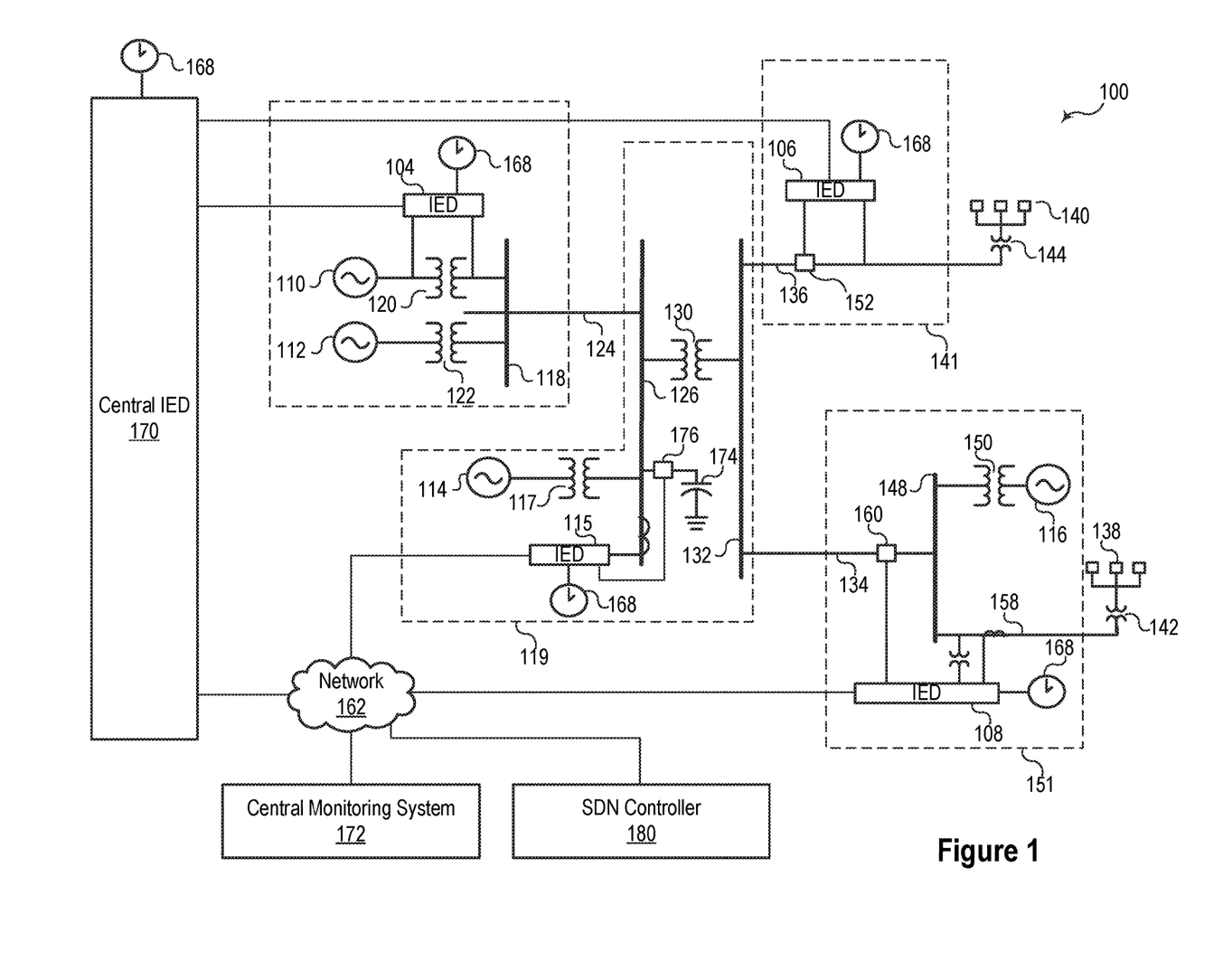
FIG. 1 illustrates an example of a simplified one-line diagram of an electric power transmission and distribution system in which a plurality of communication devices facilitate communication in a software-defined network ("SDN").

FIG. 1 illustrates an example of an embodiment of a simplified one-line diagram of an electric power transmission and distribution system 100 in which a plurality of communication devices may facilitate communication in a software-defined network. Electric power delivery system 100 may be configured to generate, transmit, and distribute electric energy to loads. Electric power delivery systems may include equipment, such as electric generators (e.g., generators 110, 112, 114, and 116), power transformers (e.g., transformers 117, 120, 122, 130, 142, 144 and 150), power transmission and delivery lines (e.g., lines 124, 134, and 158), circuit breakers (e.g., breakers 152, 160, 176), busses (e.g., busses 118, 126, 132, and 148), loads (e.g., loads 140, and 138) and the like. A variety of other types of equipment may also be included in electric power delivery system 100, such as voltage regulators, capacitor banks, and a variety of other types of equipment.

The substation 119 may include a generator 114, which may be a distributed generator, connected to a bus 126 through a step-up transformer 117. A step-down transformer 130 connects the bus 126 to a distribution bus 132. Various distribution lines 136 and 134 may be connected to the distribution bus 132. The distribution line 136 may lead to a substation 141, and an IED 106 may monitor and/or control the distribution line 106. For example, the IED 106 may selectively open and close breaker 152. The distribution line 136A may feed load 140. An additional step-down transformer 144 is shown in communication with the distribution bus 132 via the distribution line 136 and may be used to step down a voltage for consumption by the load 140.

The distribution line 134 may lead to a substation 151, and deliver electric power to a bus 148. The bus 148 may also receive electric power from a distributed generator 116 via a transformer 150. A distribution line 158 may deliver electric power from the bus 148 to a load 138, and may include another step-down transformer 142. A circuit breaker 160 may selectively connect the bus 148 to the distribution line 134. An IED 108 may monitor and/or control the circuit breaker 160 as well as the distribution line 158.

A central monitoring system 172 and the intelligent electronic devices (IEDs), such as the IEDs 104, 106, 108, 115, and 170, may monitor, control, automate, and/or protect the electric power delivery system 100. In general, an electric power generation and transmission system may utilize IEDs for protection, control, automation, and/or monitoring of equipment. For example, the system may use IEDs to monitor equipment of many types, including electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other types of monitored equipment.

As used herein, an IED (such as IEDs 104, 106, 108, 115, and 170) may refer to any microprocessor-based device that monitors, controls, automates, and/or protects monitored equipment within system 100. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

A common time signal may be distributed throughout system 100. Utilizing a common or universal time source may ensure that IEDs have a synchronized time signal that can be used to generate time synchronized data, such as synchrophasors. In various embodiments, IEDs 104, 106, 108, 115, and 170 may receive a common time signal 168. The time signal may be distributed in system 100 using a network 162 or using a common time source, such as a Global Navigation Satellite System ("GNSS"), or the like.

According to various embodiments, a central monitoring system 172 may comprise one or more of a variety of types of systems. For example, the central monitoring system 172 may include a supervisory control and data acquisition (SCADA) system and/or a wide-area control and situational awareness (WACSA) system. A central IED 170 may be in communication with the various IEDs 104, 106, 108, and 115. IEDs 104, 106, 108 and 115 may be remote from the central IED 170, and may communicate over various media such as a direct communication from IED 106 or over a communications network 162. According to various embodiments, certain IEDs may be in direct communication with other IEDs (e.g., IED 104 is in direct communication with central IED 170) or may be in communication via a network 162 (e.g., IED 108 is in communication with central IED 170 via communication network 162).

Networking devices including, but not limited to, multiplexers, routers, hubs, gateways, firewalls, and switches may be used to facilitate the network 162. In some embodiments, IEDs and network devices may comprise physically distinct devices. In other embodiments, IEDs and network devices may be composite devices or may be configured in a variety of ways to perform overlapping functions. IEDs and network devices may comprise multi-function hardware (e.g., processors, computer-readable storage media, communications interfaces, etc.) that can be utilized to perform a variety of tasks that pertain to network communications and/or operation of equipment within system 100.

An SDN controller 180 may be configured to interface with equipment in the network 162 to create an SDN that facilitates communication between the various IEDs 170, 115, and 108, the monitoring system 172, and/or other networked devices. In various embodiments, the SDN controller 180 may be configured to set flow entries for controlling data flow in the network 162.

In various embodiments, the SDN controller may implement an SDN application configured to determine path planning for the SDN including the multipoint redundant network devices. In various embodiments, the path planning may identify multipoint nodes and translate destinations into conceptual destinations in order to perform the path planning operations in accordance with the several embodiments hereof.

Figure 2:
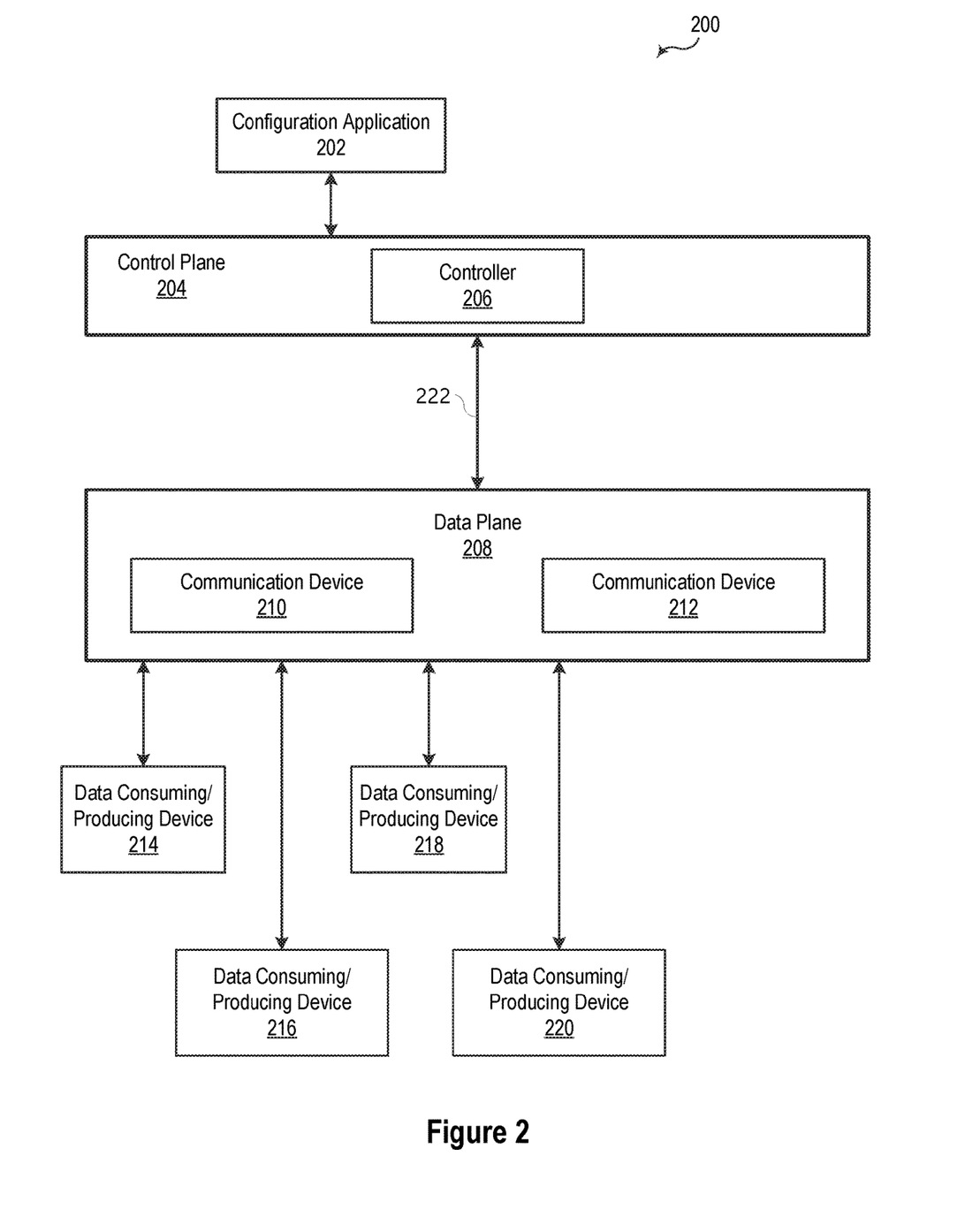
FIG. 2 illustrates an example of a conceptual representation of an SDN architecture including a configuration application, a control plane, a data plane, and a plurality of data consuming/producing devices.

FIG. 2 illustrates an example of a conceptual representation of an SDN architecture 200 including a configuration application 202, a control plane 204, a data plane 208, and a plurality of data consumers/producer devices 214, 216, 218, 220. Configuration application 202 represents any of a variety of applications for configuring the controller 206 within (or embodying) the control plane 204. Such application can be tailored to fit a wide variety of system needs, including path planning as described herein.

A pathway 222 may be used to pass information between the data plane 220 and the control plane 204. In some embodiments, pathway 222 may use, for example, the OpenFlow protocol. The OpenFlow protocol operates on and controls how packets are forwarded by configuring the way the switch behaves. Pathway 222 may thereby direct the traffic to the intended networking devices, such as communication devices 210 and 212 on data plane 208.

The data plane 220 includes communication devices 210 and 212 in communication with one another. In various embodiments, the communication devices 210 and 212 may be embodied as switches, multiplexers, and/or other types of communication devices. The communication links may be embodied as Ethernet, fiber optic, and/or other forms of data communication channels. The data consuming/producing devices 214-220 may represent a variety of devices within an electric power transmission and distribution system that produce or consume data.

For example, data consuming/producing devices may be embodied as a pair of transmission line relays configured to monitor an electrical transmission line. The transmission line relays may monitor various aspects of the electric power flowing through the transmission line (e.g., voltage measurements, current measurements, phase measurements, synchrophasors, etc.) and may communicate the measurements to implement a protection strategy for the transmission line. Traffic between the transmission line relays may be routed through the data plane 208 using a plurality of data flows implemented by controller.

Figure 3:
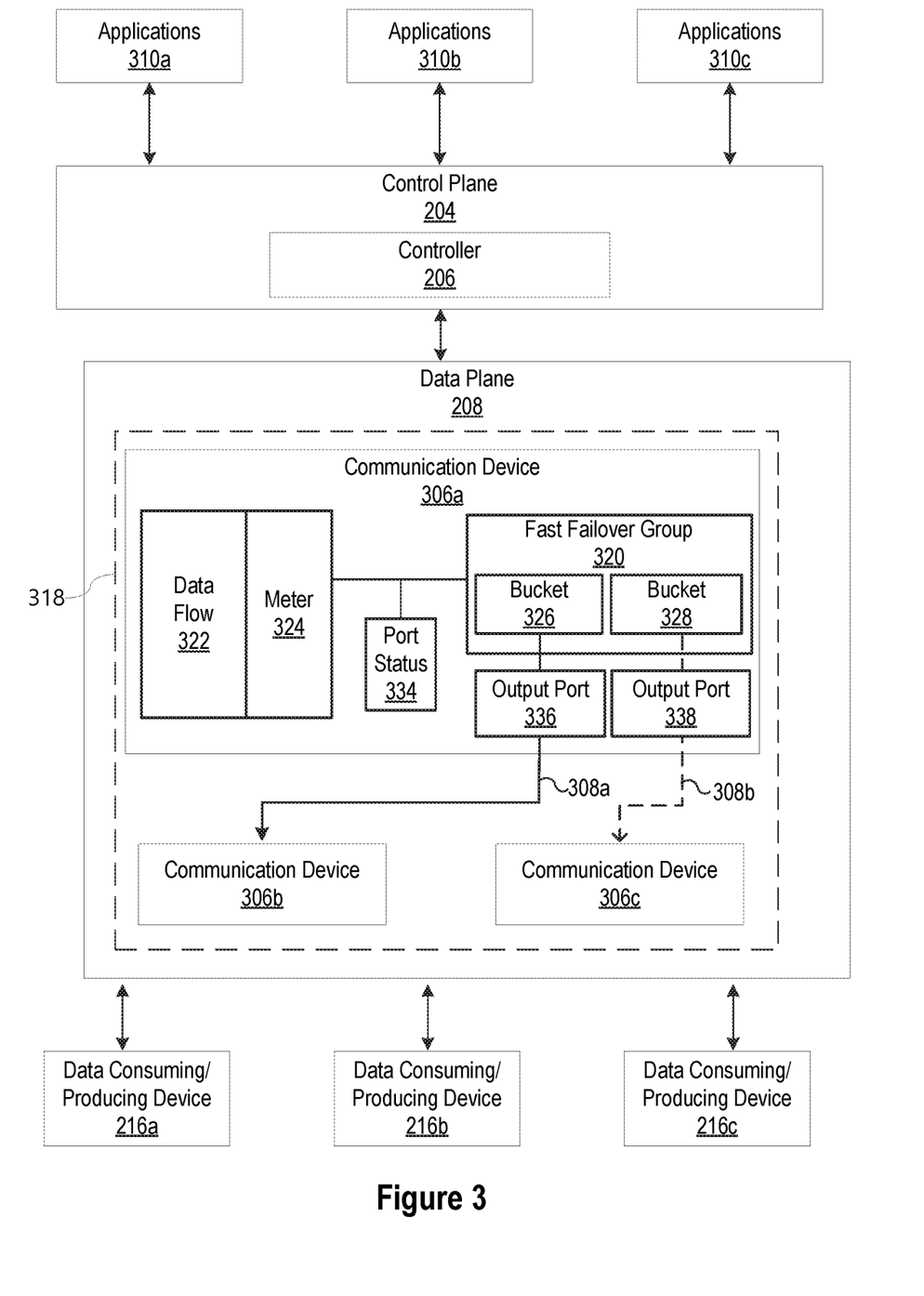
FIG. 3 illustrates a conceptual representation of an SDN architecture including a functional block diagram of a communication device of the data plane.

FIG. 3 illustrates a conceptual representation of a programmable communications network (SDN) including a control plane 204, a data plane 208, and a plurality of data-consuming and data-producing devices 216a, 216b, 216c that may be deployed in an electric power transmission and distribution system consistent with embodiments of the present disclosure. The control plane 204 directs the flow of data through the data plane 208. More specifically, a controller 206 may communicate with the plurality of communication devices 306a, 306b, 306c via an interface to establish data flows. The controller 206 may specify rules for routing traffic through the data plane 208 based on a variety of criteria. In some embodiments, applications 310a, 310b, 310c may be used to configure the control plane 204. One such application may be a path planning application used to plan communication paths of the programmable communications network in accordance with the embodiments described in more detail herein. The path planning application may be used to determine communication paths that avoid redundant communication packet delivery to individual communication interfaces of multipoint nodes even in failover.

As illustrated, the data plane 208 includes a plurality of communication devices 306a-306c in communication with one another via a plurality of physical links 308a, 308b. In various embodiments, the communication devices 306a-306c may be embodied as switches, multiplexers, and other types of communication devices. The physical links 308a, 308b may be embodied as Ethernet, fiber optic, and other forms of data communication channels. As illustrated, the physical links 308a, 308b between the communication devices 206a-206c may provide redundant connections such that a failure of one of the physical links 308a, 308b is incapable of completely blocking communication with an affected communication device. In some embodiments, the physical links 308a, 308b may provide an N−1 redundancy or better.

The data consuming/producing devices 216a-c may represent a variety of devices within an electric power transmission and distribution system that produce or consume data. For example, data consuming/producing devices may, for example, be embodied as a pair of transmission line relays configured to monitor an electrical transmission line. The transmission line relays may monitor various aspects of the electric power flowing through the transmission line (e.g., voltage measurements, current measurements, phase measurements, synchrophasors, etc.) and may communicate the measurements to implement a protection strategy for the transmission line. Traffic between the transmission line relays may be forwarded through the data plane 208 using a plurality of data flows implemented by controller 206. As described in more detail hereafter, data consuming/producing devices may be multipoint nodes with more than one communication connection to the data plane 208. A protective relay is an example of a multipoint node device due to its two or more communication ports with the data plane. A tie point is another example of a multipoint node. Redundant delivery of messages to a single interface of the multipoint node is to be avoided. However, because the multipoint nodes include multiple interfaces in the form of communication ports in communication with the data plane, failover schemes designed without consideration of multipoint nodes may default to delivery of a communication packet multiple times on the same communication interface of the multipoint node. What is needed is a method to avoid such redundant packet delivery on a single communication interface of the multipoint node. Of course, data consuming/producing devices 216a-c may be embodied by a wide range of devices consistent with embodiments of the present disclosure.

The plurality of communication devices 306a-306c may each include a trust/encryption subsystem that secure communications among devices in the data plane 208. In various embodiments, the trust/encryption subsystem may be issued one or more certificates by controller 206. The one or more certificates may be used to encrypt data traffic sent or received by a particular device. Further, the trust/encryption subsystem may be configured to verify the identity of a sender of SDN data.

A data flow 322 in data plane 208 may be configured to operate in conjunction with fast failover group entries 320. Fast failover group entries 320 may comprise a plurality of buckets, such as buckets 326 and 328. Ingress packets (not shown) may match a criterion specified by data flow 322 and may be counted by meter 324. Fast failover group 320 may switch between bucket 326 and bucket 328 based on the port link state 334. If the port link state 334 is "up," bucket 326 may be active, and if the port link state 336 is "down," bucket 328 may be active.

As illustrated, bucket 326 may forward egress traffic associated with data flow 322 through output port 336, while bucket 328 may forward egress traffic through output port 338. The traffic may be directed to different physical links and different communication devices to reduce network congestion and data packet loss. In the illustrated embodiment, output port 336 may be associated with physical link 308a and may direct the traffic associated with data flow 322 to communication device 306b. Output port 338 may be associated with physical link 308b and may be associated with physical link 308b and may direct the traffic associated with data flow 322 to communication device 306c. In various embodiments the implementation of the logic in bucket 326 and bucket 328 may be implemented using the IEC 61850-9-2 standard.

Figure 4:
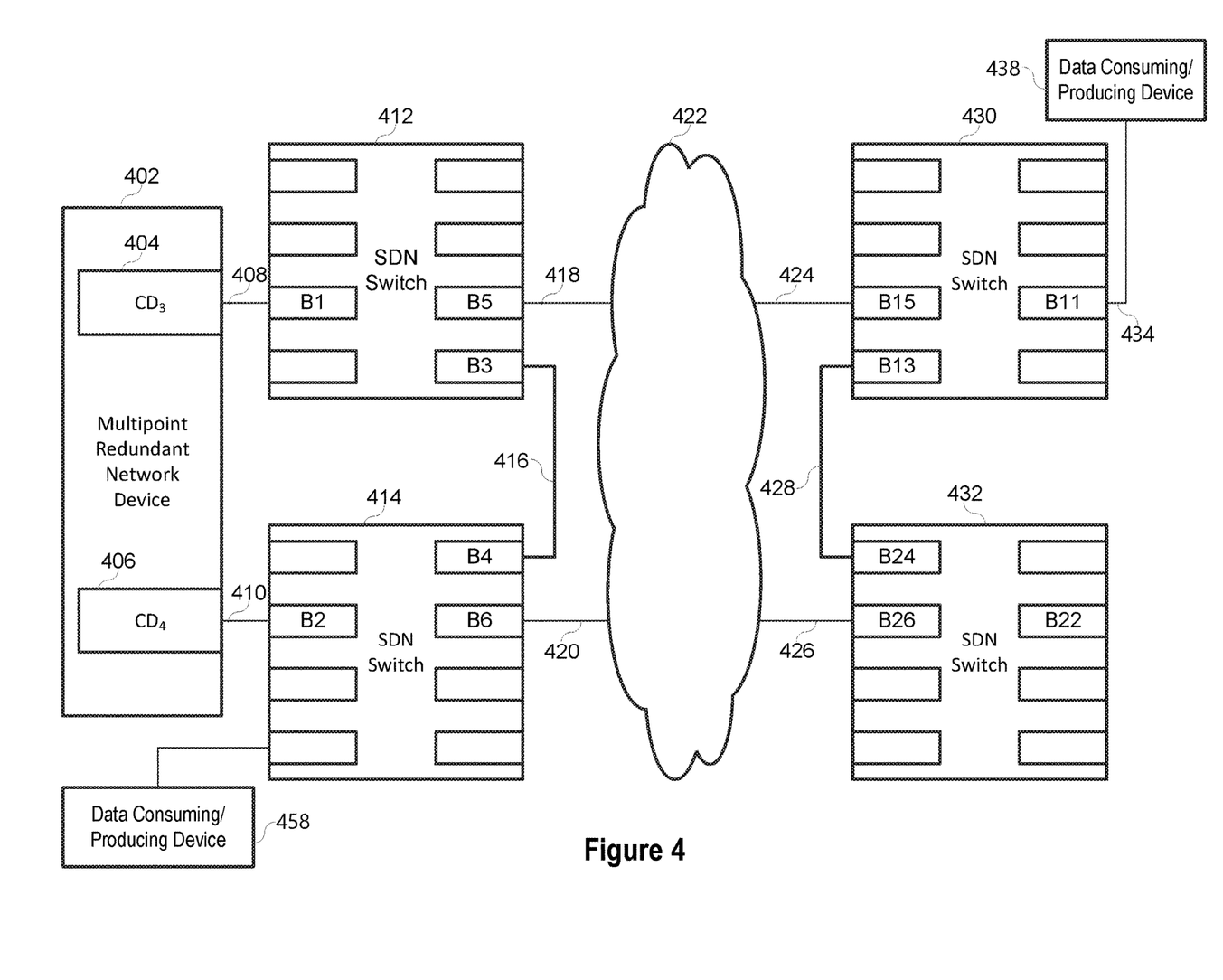
FIG. 4 illustrates a network diagram of devices in an SDN network including a destination device embodied as a multipoint redundant network device in accordance with several embodiments herein.

FIG. 4 illustrates a simplified block diagram of a programmable communication system with a connected multipoint node in the form of a multipoint redundant network device 402. The programmable communication system may include path planning to avoid redundant packet delivery to a single interface of the multipoint node while ensuring packet delivery to the multipoint node, even under failover conditions. The programmable communications network may be an SDN, including communication devices in the form of programmable switches 412, 414, 430, 432, and may include various other communication devices within network 422. Multiple other data-consuming, data-producing devices 438, 458 may also communicate via the SDN. Multipoint redundant network device 402 is representative of multiple multipoint nodes in communication via the SDN. Multipoint nodes may be data consuming devices and/or data producing devices. For example, in an electric power protection system, protective relays may include multiple redundant physical communication ports, and send and receive communications to other protective relays using the SDN.

Multipoint node 402 includes a first physical communication port $CD_3$ 404 in communication with port B1 of SDN switch 412 via link 408; and a second physical communication port $CD_4$ 406 in communication with port B2 of SDN switch 412 via link 410. SDN switch 412 is in communication via port B3 with SDN switch 414 over link 416 via port B4. SDN switches 412 and 414 are in communication with the network via links 418 and 420 at ports B5 and B6. SDN switches 430 and 432 are in communication via link 428 at ports B13 and B24. SDN switches 430 and 432 are in communication with the network via links 424 and 426. It should be noted that while links 416 and 428 present a convenient path for packet communication between switches 412 and 414, and 430 and 432, various embodiments do not include one or more of links 416 and 428.

Under normal operating conditions, the programmable network may be configured with a path plan such that messages addressed to multipoint node 402 may be delivered using ports 404 and 406 via link 408 to SDN switch 412 and link 410 to SDN switch 414. Due to the redundancy of the multipoint node 402, a message addressed to the multipoint node 402 may be delivered more than once, although only processed once because only the active/listening port will pass the message for further processing. Upon failure of a path or a switch, the programmable network may be configured to detect the failure and enter a failover mode wherein an alternate communication path is used. The alternate path may result in redundant delivery of a communication packet to a single port of the multipoint node. For example, every communication packet to multipoint node 402 must be duplicated at some point for the delivery on both ports $CD_3$ 404 and $CD_4$ 406. Upon failure of link 410, the programmable network may failover to switching of the copy of the message originally destined for port $CD_4$ 406 to be delivered instead to port $CD_3$ 404, resulting in redundant delivery to the same port. This redundant delivery of messages to a single interface of the multipoint node 402 should be avoided.

The controller as described herein is configured to determine multipoint nodes in the programmable network and calculate communication paths through the network for delivery of communication packets on each interface of the multipoint node, while avoiding redundant delivery of a packet to a single interface of the multipoint node, even under failover conditions.

Figure 5:
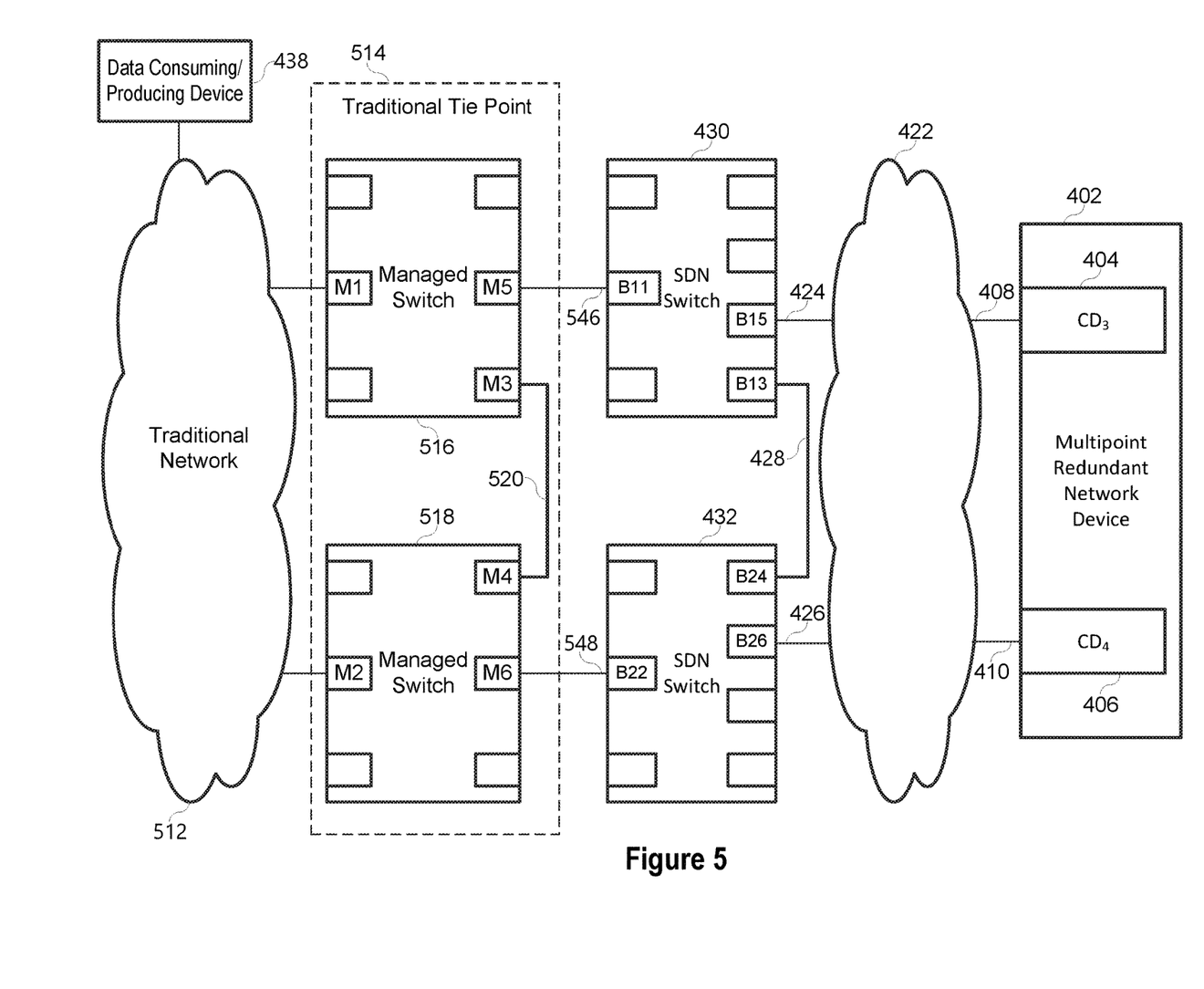
FIG. 5 illustrates a network diagram of devices in a network that includes an SDN and a traditional tie point as a multipoint node in accordance with several embodiments herein.

FIG. 5 illustrates a simplified block diagram of another programmable communication system with a connected multipoint node in the form of a traditional communication network tie point. 514. In particular, a multipoint node 402 may be in communication with an SDN 422, which may be in communication with a traditional network 512 via a tie point 514. The tie point 514 may be represented as a single node with multiple physical communication ports, and may, therefore, be considered a multipoint node in accordance with the embodiments described herein.

In particular, switches 430 and 432 (which may be part of the SDN 422) may be in communication over link 428 via ports B13 and B24. Switches 430 and 432 may be in communication with the tie point 514 via links 546 (between ports B11 and M5) and 548 (between ports B22 and M6). The tie point 514 may include switches 516 and 518, which may be in communication with each other over link 520 via ports M3 and M4. Although the illustrated tie point includes two managed switches 516, 518 linked 520 for redundancy, any of many different configurations of a tie point 514 may be used. The tie point 514 may be in communication with the traditional network 512 via links from ports M1 and M2. Managed switches 516 and 518 may be configured such that communications are provided to the traditional network using one or more physical links. However, the SDN should be configured to avoid multiple deliveries of the same message to a single communication interface (e.g. M6 over 548 or M5 over 546) of the tie point 514. That is, a copy of the message should be delivered to the traditional tie point 514 over link 546 (to M5) and over link 548 (to M6), but should not be redundantly delivered on the same link (546 or 548) to the same port (M5 or M6), even when in a failover state. The traditional tie point 514 may be configured to deliver one copy of the packet out of each port M1, M2 to the traditional network for routing to the addressed device 438.

As can be seen, the system may be defined in terms of nodes (such as the multipoint node 402, data-consuming data-producing devices 438, 458, and switches 412, 414, 430, 432), links (e.g. 408, 410, 418, 416, 420, 424, 428, 426, 434) and ports (e.g. B1, B2, B3, B4, B5, B6, B11, B13, B15, B22, B24, B26). Data paths between data-consuming and data-producing devices can be defined in terms of nodes, links, and ports. Further, a topology of the system may be created in terms of nodes, links, and ports. According to several embodiments herein, the topology of the system is defined in terms of nodes, links, and ports in order to identify multipoint nodes and determine path planning to avoid redundant message delivery to a single interface of a multipoint node when multipoint nodes are present.

Figure 6:
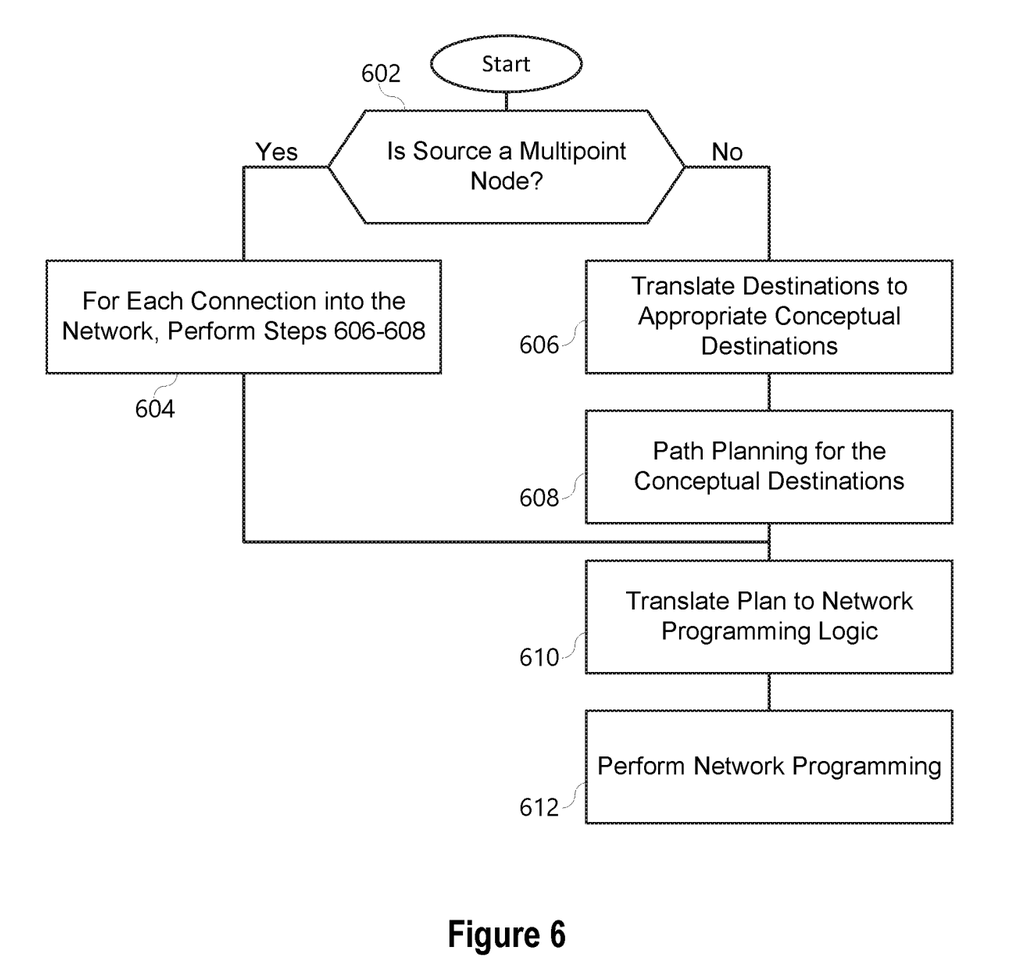
FIG. 6 illustrates a flow chart of a method for managing multipoint redundant network device path planning in accordance with several embodiments hereof.

FIG. 6 illustrates a simplified process diagram of a method to determine path planning for a programmable communication system to avoid redundant message delivery to a single interface of a multipoint node when multipoint nodes are present. The method may be performed as a configuration application 202 of the controller 206 of a programmable communications network. A topology of the programmable communication network may be made available to the application performing the path planning. The topology may define the programmable communication network in terms of nodes, links, and ports. The method may start with a determination of whether a communication source is a multipoint node 602. As can be seen in FIG. 5, device 402 may be a source of communications, and comprises a multipoint redundant network device such as a power system protection relay. As such, it is a source multipoint node. For source nodes that are not multipoint nodes, the method translates destinations to appropriate conceptual destinations 606. Additional details of this step are described below. Once the destinations have been translated into appropriate conceptual destinations, path planning is performed for the conceptual destinations 608.

At 602, if the source is a multipoint node, the process performs steps 606 and 608 for each connection of the multipoint node into the network 604. That is, for each link to a port of the source multipoint node, the method translates destinations to appropriate conceptual destinations and performs path planning for the conceptual destinations from each port of the source multipoint node 604.

Once the path planning has been performed 608, the method translates the plan to network programming logic 610 and performs the network programming 612. The network programming 612 may be performed by the controller 206 by sending the path planning instructions to the various communications devices of the data plane 208. Once programmed, the communication devices of the data plane 208 operate in accordance with the path planning to avoid unnecessary redundant messages when multipoint nodes are present. In various embodiments, the calculated path planning may be presented to a user before programming the communication devices 612 for approval.

Upon programming of the communication devices 612, the data plane may operate in accordance with the path planning determined by the controller 206. That is, communications may flow through the programmable communication network in accordance with the path planning.

Figure 7:
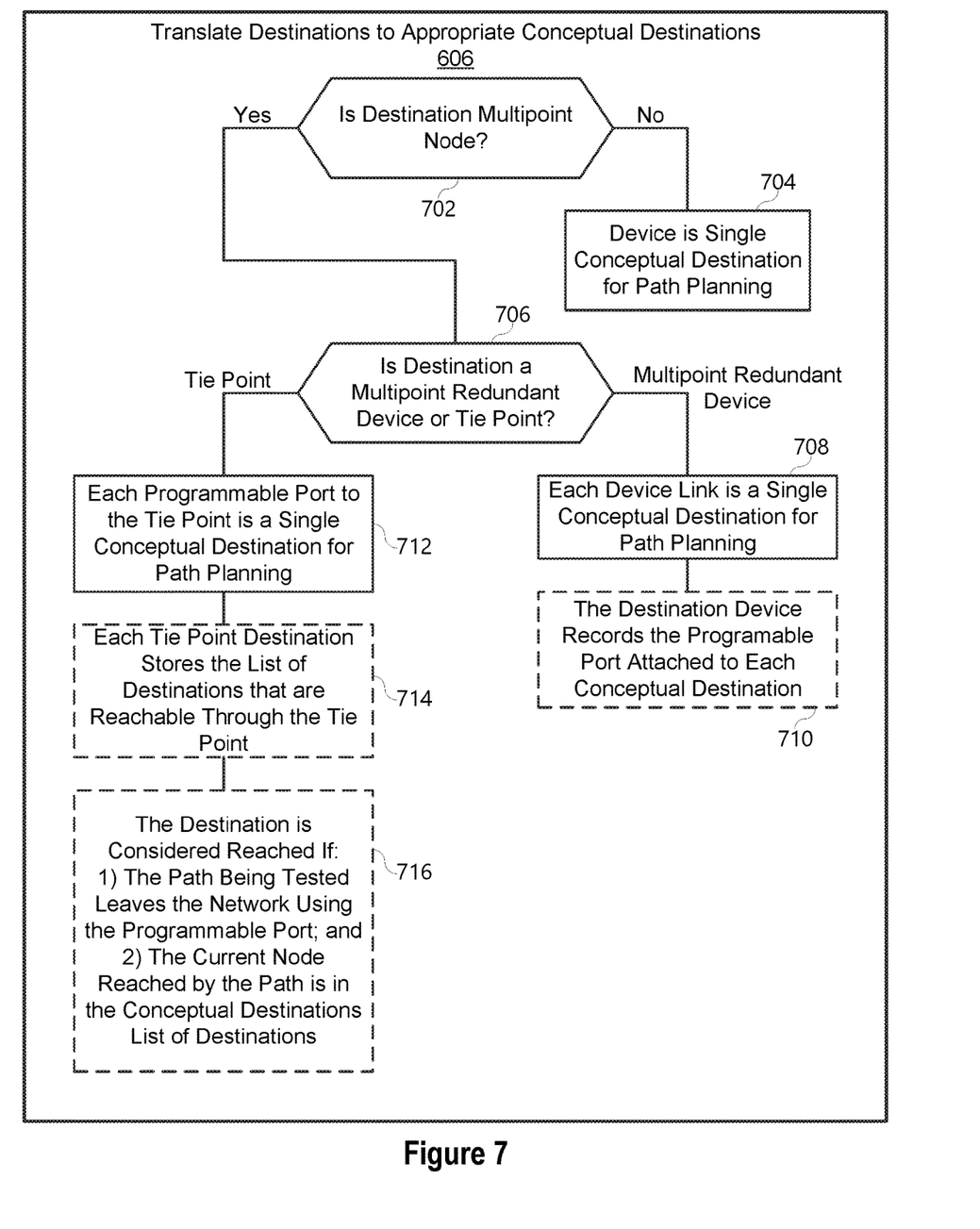
FIG. 7 illustrates a flowchart of a method for translating destinations to appropriate conceptual destinations in accordance with several embodiments herein.

FIG. 7 illustrates a portion of the method of FIG. 6 related to the step of translating destinations to appropriate conceptual destinations 606. The illustrated method translates destinations to appropriate conceptual destinations from each source (or each port for the multipoint nodes). The translation determines whether the destination is a multipoint node 702. If the destination is not a multipoint node, then the destination device is considered a single conceptual destination for path planning 704.

If, however, the destination is a multipoint node 702, then the method proceeds to determine whether the destination is a multipoint redundant device (see, e.g. FIG. 4) or a tie point 706 (see, e.g. FIG. 5). If it is determined that the multipoint node is a multipoint redundant device, then the method considers each device link as a single conceptual destination for path planning 708. Each destination device records the programmable port attached to each conceptual destination 710.

When the destination multipoint node 706 is a tie point, the method proceeds such that each programmable port to the tie point (e.g. ports B11 and B22 of FIG. 5) is a single conceptual destination for path planning 712. Each tie point destination stores the list of destinations that are reachable through the tie point 714. For path planning, the destination is considered reached if: 1) the path being tested leaves the network using the programmable port (of 712); and 2) the current node reached by the path is in the conceptual destinations list of destinations.

Figure 8:
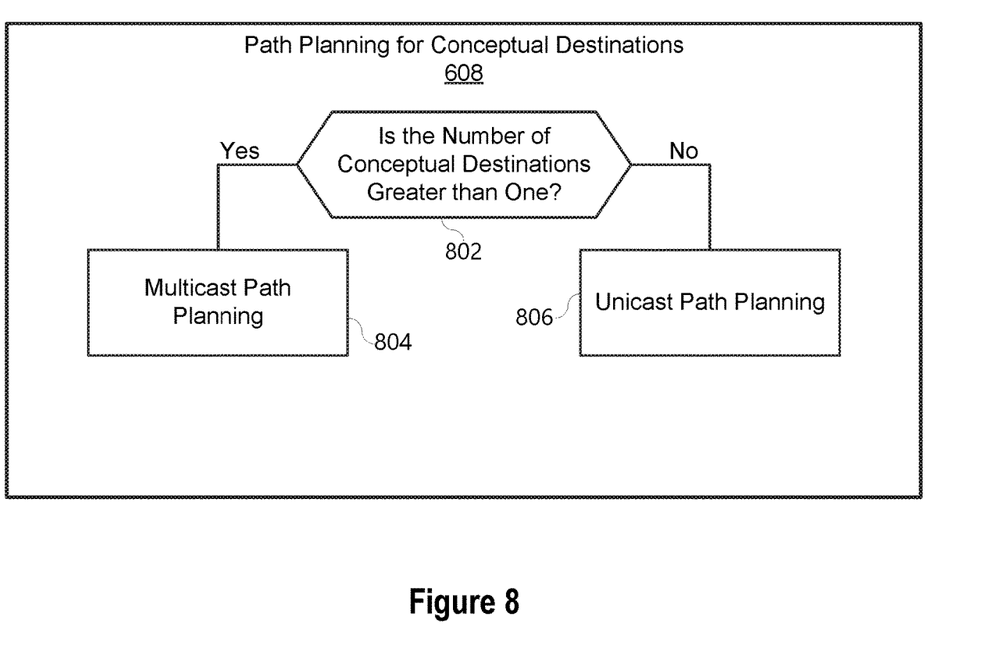
FIG. 8 illustrates a flowchart of a method for path planning for conceptual destinations in accordance with several embodiments herein.

FIG. 8 illustrates a portion of the method of FIG. 6 related to the step of path planning for conceptual destinations 608 for the list of conceptual destinations determined in 606. If the number of conceptual destinations is greater than one 802, then the path planning performs multicast path planning 804. Multicast path planning determines a communication path plan across nodes, links, and ports to the conceptual destinations, and avoids redundant delivery of a message to a single interface of a multipoint node. When a destination node is specified, and the method determines that the destination is a multipoint node (with multiple conceptual destinations), then the method determines a multicast path to the destination. That is, messages to the single destination (which may include multiple conceptual destinations) would need to be ready for delivery out of multiple ports of the programmable communications network, and would therefore need to be duplicated.

In particular, even if a user specifies a single destination for unicast Ethernet traffic over the programmable communication network, if the network controller described herein determines that the single destination is a multipoint node (i.e. includes multiple conceptual destinations), then the path planning in accordance with this disclosure will select multicast path planning. Delivery of a single communication packet to the multipoint node would include delivery of the message to each communication port of the programmable communication network that is in communication with the multipoint node. Conversely, if a user specifies a single destination for unicast Ethernet traffic over a programmable communication network, if the network controller described herein determines that the single destination is not a multipoint node (i.e. does not include multiple conceptual destinations), then the path planning may be unicast. Unicast path planning does not require packet duplication.

As has been described above, the path planning may be performed by a network controller on a control plane. The network controller may include software instructions for performing the path planning in accordance with the particular communications network. The network controller may include a user interface to facilitate user inputs for the path planning. The path planning may require a number of inputs to begin the path planning process. For example, a network topology for which the path planning process is to be performed may be defined in terms of the nodes, ports, and links that are to be used to find the paths. Multipoint nodes may be identifiable either by input configuration or by analysis of the defined topology. The multipoint nodes may be identified by a user or identified by the network controller based on the topology.

Path planning by the network controller may be configured to plan communication paths from a source (single sources and multipoint sources) to conceptual destinations. The path planning may generate failover paths for redundancy if requested by the user. Multicast or unicast path planning may be requested. However, if a multiple conceptual destinations are identified, multicast path planning to the multipoint node that includes the conceptual destinations will be used. The network device may require specification of the source device(s) from which path planning is to be performed, and specification of the destination device(s) to which path planning is to be performed. Additional network programming match criteria may be entered by the user for path planning. With this information and settings, the network device may perform the path planning and program the network devices as described hereinabove.

In the description above, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims are hereby expressly incorporated into this Detailed Description, with each claim standing on its own as a separate embodiment. This disclosure also includes all permutations and combinations of the independent claims with their dependent claims.

What is claimed is:

1. A system for path planning in a programmable communication network, comprising:
a network controller in a control plane, in communication with a plurality of programmable communication devices, to:
generate a plurality of communication flows for communication through the programmable communication network from a source to a destination, by:
determining that a destination is a destination multipoint node with at least two physical destination connections to the programmable communication network;
translating each physical destination connection to a conceptual destination;

determining that a source is a source multipoint node with at least two source physical connections to the programmable communication network;

for each source physical connection of the source multipoint node to the programmable communication network, planning paths from each source physical connection to each conceptual destination and avoid redundant communication to the same physical destination connection of the destination multipoint node, to form the plurality of communication flows;

program the plurality of network devices in a data plane based on a plurality of communication flows; and at least one network device in the data plane, in communication with the network controller and the destination multipoint node to:

receive at least a portion of the plurality of communication flows from the network controller; and forward traffic to the destination multipoint node according to the plurality of communication flows received from the network controller.

2. The system of claim 1, wherein the destination multipoint node comprises a multipoint redundant device.

3. The system of claim 2, wherein the multipoint redundant device comprises a protective relay of an electric power delivery system.

4. The system of claim 2, wherein the multipoint redundant device comprises two physical destination connections to the programmable communication network, each physical destination connection comprising a separate conceptual destination to the destination multipoint node.

5. The system of claim 1, wherein the destination multipoint node comprises a tie point.

6. The system of claim 5, wherein the tie point is in communication with a communication network that is not a programmable communication network.

7. The system of claim 5, wherein the tie point comprises at least two communications switches, each separately in communication with the two network devices.

8. The system of claim 5, wherein each network device of the two network devices comprises a programmable port to form the physical destination connections with the tie point, each programmable port comprising conceptual destinations.

9. A system for path planning in a programmable communication network, comprising:

a network controller in a control plane, in communication with a plurality of programmable communication devices, to:

generate a plurality of communication flows for communication through the programmable communication network from a source to a destination, by:

determining that a destination is a destination multipoint node with at least two physical destination connections to the programmable communication network;

translating each physical destination connection to a conceptual destination;

planning paths from a source to each conceptual destination to form the plurality of communication flows;

program the plurality of network devices in a data plane based on a plurality of communication flows; and at least one network device in the data plane, in communication with the network controller and the destination multipoint node to:

receive at least a portion of the plurality of communication flows from the network controller; and forward traffic to the destination multipoint node according to the plurality of communication flows received from the network controller.

10. The system of claim 9, further comprising a plurality of sources.

11. The system of claim 10, wherein the network controller is configured to plan paths from each source of the plurality of sources to each conceptual destination to form the plurality of communication flows.

12. The system of claim 10, wherein at least two sources of the plurality of sources comprises a source multipoint node that includes at least two source connections to the programmable communication network.

13. The system of claim 12, wherein the network controller is configured to plan paths from each source multipoint connection to each conceptual destination to form the plurality of communication flows.

14. A method for path planning in a programmable communication network, comprising:

generating, by a network controller in a control plane, a plurality of communication flows for communication through the programmable communication network from a source to a destination, by:

determining that a destination is a destination multipoint node with at least two physical destination connections to the programmable communication network;

translating each physical destination connection to a conceptual destination;

planning paths from a source to each conceptual destination to form the plurality of communication flows;

programming a plurality of network devices in a data plane based on a plurality of communication flows;

receiving, by a network device of the plurality of network devices in the data plane, at least a portion of the plurality of communication flows from the network controller; and forwarding, by the network device, traffic to the destination multipoint node according to the plurality of communication flows received from the network controller.

15. The method of claim 14, further comprising generating the plurality of communication flows from a plurality of sources to a destination.

16. The method of claim 15, wherein the step of planning paths comprises planning paths from each source of the plurality of sources to each conceptual destination.

17. The method of claim 15, wherein at least two sources of the plurality of sources comprise a source multipoint node that includes at least two source multipoint connections to the programmable communication network.

18. The method of claim 14, wherein the destination multipoint node comprises a multipoint redundant device.

19. The method of claim 14, wherein the destination multipoint node comprises a tie point with a communication network that is not a programmable communication network.

20. The method of claim 14, wherein the step of planning paths avoids redundant communication to the destination multipoint node.

* * * * *